United States Patent
Matsui

(10) Patent No.: US 12,017,763 B2
(45) Date of Patent: Jun. 25, 2024

(54) VERTICAL TAKE-OFF AND LANDING AIRCRAFT AND WING APPARATUS

(71) Applicant: SUBARU CORPORATION, Tokyo (JP)

(72) Inventor: Yuki Matsui, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 138 days.

(21) Appl. No.: 17/478,159

(22) Filed: Sep. 17, 2021

(65) Prior Publication Data
US 2022/0097836 A1  Mar. 31, 2022

(30) Foreign Application Priority Data
Sep. 28, 2020  (JP) .................................. 2020-161809

(51) Int. Cl.
*B64C 29/00* (2006.01)
*B64C 11/00* (2006.01)
*B64C 27/46* (2006.01)
*B64C 39/10* (2006.01)

(52) U.S. Cl.
CPC ........ *B64C 29/0025* (2013.01); *B64C 27/463* (2013.01); *B64C 11/001* (2013.01); *B64C 2039/105* (2013.01)

(58) Field of Classification Search
CPC . B64C 39/10; B64C 2039/105; B64C 11/001; B64C 29/0025; B64C 21/02; B64C 21/025; B64C 21/04; B64C 21/06; B64C 11/16; B64C 11/18; B64C 11/24
See application file for complete search history.

(56) References Cited

U.S. PATENT DOCUMENTS

| 2,075,817 | A | * | 4/1937 | Loerke | B64C 23/065 244/130 |
| 3,974,986 | A | | 8/1976 | Johnstone | |
| 6,948,906 | B2 | * | 9/2005 | Leishman | B64C 21/02 415/914 |
| 2007/0252047 | A1 | | 11/2007 | Pal | |
| 2020/0039640 | A1 | | 2/2020 | Kobayashi et al. | |

(Continued)

FOREIGN PATENT DOCUMENTS

| JP | 2019-064541 A | 4/2019 |
| JP | 2020-023217 A | 2/2020 |

OTHER PUBLICATIONS

Notice of Reasons for Refusal received in corresponding Japanese Patent Application No. 2020-161809, dated Feb. 27, 2024.

*Primary Examiner* — Nicholas McFall
*Assistant Examiner* — Terri L Filosi
(74) *Attorney, Agent, or Firm* — Rimon P.C.

(57) ABSTRACT

A vertical take-off and landing aircraft includes a ducted rotary wing. The ducted rotary wing includes a duct and a rotary wing. The duct runs through a body from an upper surface to a lower surface thereof. The rotary wing is provided inside the duct and includes a hub and a blade configured to rotate about the hub. The blade includes a tip inlet, a trailing-edge outlet, and a trailing-edge flow path. The tip inlet is provided on a tip surface of the blade. The trailing-edge outlet is provided at a trailing edge that is an edge on a rear side in a rotation direction of the blade. The trailing-edge flow path allows the tip inlet and the trailing-edge outlet to be in communication with each other.

7 Claims, 4 Drawing Sheets

(56) References Cited

U.S. PATENT DOCUMENTS

| | | | |
|---|---|---|---|
| 2020/0115035 A1* | 4/2020 | Groninga | ............. B64C 11/001 |
| 2020/0325910 A1 | 10/2020 | Harada | |
| 2021/0053694 A1* | 2/2021 | Winkelstein | ........ B64C 29/0025 |

* cited by examiner

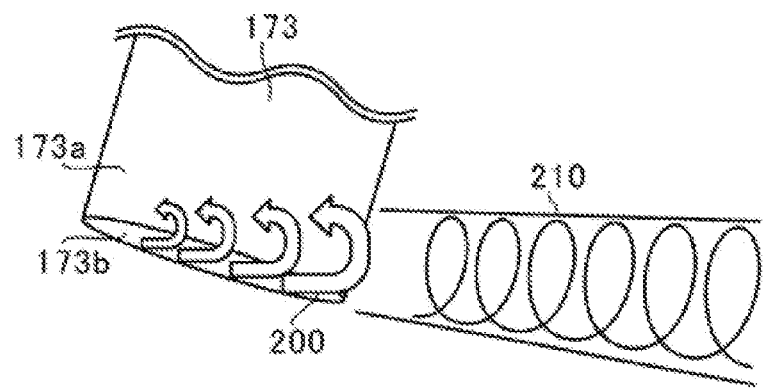
NEGATIVE PRESSURE SIDE
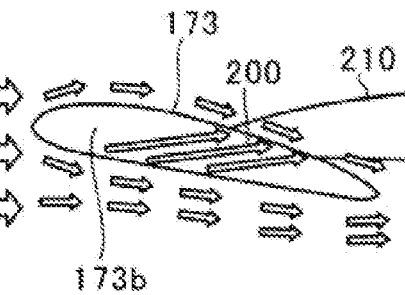
POSITIVE PRESSURE SIDE
FIG. 3A
FIG. 3B

VERTICAL TAKE-OFF AND LANDING AIRCRAFT AND WING APPARATUS

CROSS-REFERENCE TO RELATED APPLICATIONS

The present application claims priority from Japanese Patent Application No. 2020-161809 filed on Sep. 28, 2020, the entire contents of which are hereby incorporated by reference.

BACKGROUND

The technology relates to a vertical take-off and landing aircraft and a wing apparatus.

Recently, a vertical take-off and landing aircraft has been developed that includes a duct in an airframe body and includes a propulsion device for lifting disposed inside the duct. The propulsion device for lifting may be configured to allow for vertical take-off and vertical landing. Non-limiting examples of such a propulsion device for lifting may include a jet engine and a rotary wing. For example, Japanese Unexamined Patent Application Publication (JP-A) No. 2019-064541 discloses a technique to provide, in a vertical take-off and landing aircraft, a ducted fan that includes a duct and a rotary wing disposed inside the duct. JP-A No. 2019-064541 discloses to cause a clearance between a tip of a blade of the rotary wing and an inner wall surface of the duct to be as small as possible within a range that allows the tip and the inner wall surface of the duct not to touch each other. By causing the clearance between the tip and the inner wall surface of the duct to be as small as possible, it is possible to reduce a so-called tip leakage flow, which is a flow of air that curls up from a lower surface side to an upper surface side of the blade at the tip of the blade. This makes it possible to suppress generation of a tip vortex.

SUMMARY

An aspect of the technology provides a vertical take-off and landing aircraft that includes a body and a ducted rotary wing. The body includes an upper surface and a lower surface. The ducted rotary wing is provided in the body. The ducted rotary wing includes a duct and a rotary wing. The duct runs through the body from the upper surface to the lower surface. The rotary wing is provided inside the duct and includes a hub and a blade. The blade is configured to rotate about the hub. The blade includes a tip inlet, a trailing-edge outlet, and a trailing-edge flow path. The tip inlet is provided on a tip surface of the blade. The trailing-edge outlet is provided at a trailing edge of the blade. The trailing edge is an edge on a rear side in a rotation direction of the blade. The trailing-edge flow path allows the tip inlet and the trailing-edge outlet to be in communication with each other.

An aspect of the technology provides a vertical take-off and landing aircraft that includes a body and a ducted rotary wing. The body includes an upper surface and a lower surface. The ducted rotary wing is provided in the body. The ducted rotary wing includes a duct and a rotary wing. The duct runs through the body from the upper surface to the lower surface. The rotary wing is provided inside the duct and includes a hub and a blade. The blade is configured to rotate about the hub. The blade includes a leading-edge inlet, a tip outlet, and a leading-edge flow path. The leading-edge inlet is provided at a leading edge of the blade. The leading edge is an edge on a front side in a rotation direction of the blade. The tip outlet is provided on a tip surface of the blade. The leading-edge flow path allows the leading-edge inlet and the tip outlet to be in communication with each other.

An aspect of the technology provides a wing apparatus that includes the ducted rotary wing included in the vertical take-off and landing aircraft described above.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 3A and 3B are each a schematic cross-sectional view of a tip surface of a blade of a ducted rotary wing according to a comparative example.

DETAILED DESCRIPTION

Figure 1:
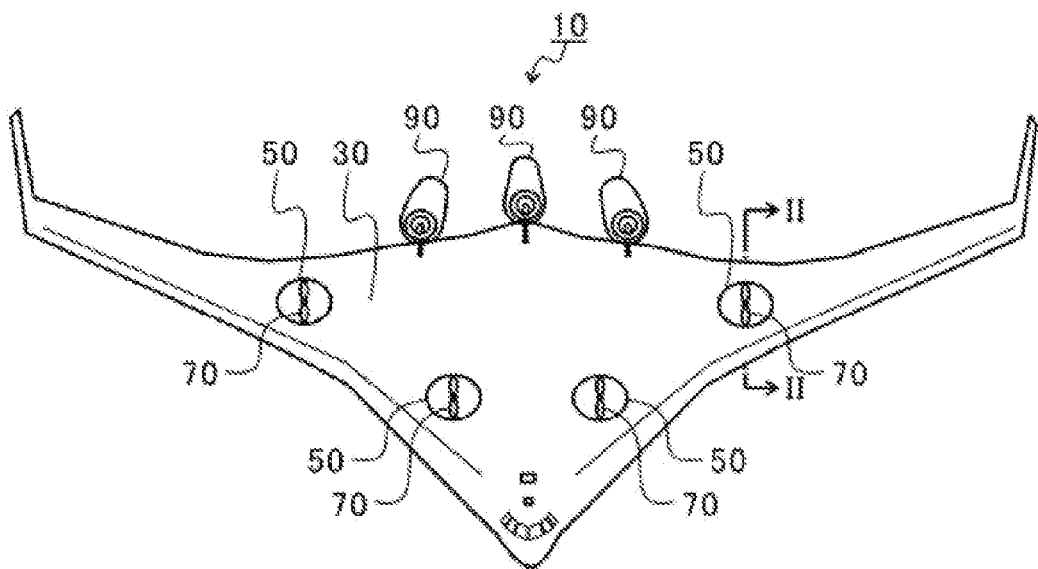
FIG. 1 is an upper-surface perspective view of an example of a vertical take-off and landing aircraft according to an example embodiment of the technology.

In the existing technique disclosed in JP-A No. 2019-064541, a tip of a blade is displaced downward due to its own weight upon low-speed rotation, is displaced in a direction approaching an inner wall surface of a duct due to centrifugal force upon middle-speed rotation, and is displaced upward due to lift upon high-speed rotation. Therefore, for example, in a case where a clearance between the tip of the blade and the inner wall surface of the duct is set to be the minimum value upon the middle-speed rotation of the rotary wing, the clearance between the tip of the blade and the inner wall surface of the duct becomes greater than the set minimum value upon the low-speed rotation and the high-speed rotation of the propeller. As a result, it is difficult to reduce a tip leakage flow of the rotary wing upon the low-speed rotation and the high-speed rotation of the rotary wing, making it difficult to reduce generation of a tip vortex.

Accordingly, there has been a need for a technique that makes it possible to effectively reduce the tip leakage flow and to thereby reduce the generation of the tip vortex also in a case, for example, where the blade of the rotary wing is deformed.

It is desirable to provide a vertical take-off and landing aircraft that makes it possible to reduce generation of a tip vortex of a ducted rotary wing.

In the following, some example embodiments of the technology will be described in detail with reference to the accompanying drawings. The dimensions, the materials, the specific numerical values, etc. described in the example embodiments are mere examples for facilitating understanding of the technology, and do not limit the technology unless otherwise specified. In the specification and the drawings, elements having substantially the same functions and configurations are denoted by the same reference numerals to omit duplicate descriptions, and elements not directly related to the example embodiments of the technology may be omitted.

[1. General Configuration of Vertical Take-Off and Landing Aircraft]

First, referring to FIG. 1, a description will be given of a general configuration of a vertical take-off and landing aircraft 10 according to an example embodiment of the technology. FIG. 1 is an upper-surface perspective view of the vertical take-off and landing aircraft 10 according to the example embodiment of the technology.

As illustrated in FIG. 1, the vertical take-off and landing aircraft 10 may include, for example but not limited to, a body 30, a duct 50, a rotary wing 70, and a forward-move propulsion device 90. The body 30 may be an apparatus having a configuration in which a body of an airframe of the vertical take-off and landing aircraft 10 and a wing body (a wing apparatus) are provided integrally. The body 30 may be provided with, for example but not limited to: a cabin; components including, without limitation, a fuel tank and a battery configured to drive the rotary wing 70 and the forward-move propulsion device 90; and various devices to be mounted on an aircraft. The body 30 may have a vertical cross-section of an airfoil shape in a front-rear direction of the vertical take-off and landing aircraft 10. Accordingly, the body 30 of the vertical take-off and landing aircraft 10 according to the example embodiment may serve as a wing body (a wing apparatus) that generates upward lift for the vertical take-off and landing aircraft 10.

The example embodiment will be described referring to an example in which the body 30 integrating the body of the airframe and the main wing serves as a wing body (a wing apparatus). However, the wing body (the wing apparatus) according to an embodiment of the technology is not limited to such an example. The wing body (the wing apparatus) according to an embodiment of the technology may be any apparatus having an airfoil shape and generating upward lift for a vertical take-off and landing aircraft. For example, the wing body (the wing apparatus) may be a main wing (a fixed wing) that is provided separately from the body of the airframe.

The duct 50 may be a hollow space that serves as an installation space that allows the rotary wing 70 to be buried in the body 30 (the wing body). The duct 50 may be provided in the body 30, and may have, for example, a cylindrical shape. The duct 50 may run through the body 30 from an upper surface 30US to a lower surface 30LS of the body 30. According to the example embodiment, four ducts 50 may be provided in the body 30. For example, two ducts 50 may be provided on the right side with respect to a center line of the body 30, and the other two ducts 50 may be provided on the left side with respect to the center line of the body 30. The four ducts 50 may be provided symmetrically about the center line of the body 30. The number of the ducts 50 is not limited to four, and may be one, two, three, five, or more.

The rotary wing 70 may be disposed inside each of the ducts 50 on a one-to-one basis. Accordingly, in the example embodiment, four rotary wings 70 may be disposed in the respective four ducts 50. The rotary wing 70 may be driven to rotate upon vertical take-off, vertical landing, and hovering of the vertical take-off and landing aircraft 10. Upon being driven to rotate, the rotary wing 70 may generate upward lift for the vertical take-off and landing aircraft 10. As described above, the vertical take-off and landing aircraft 10 according to the example embodiment may include the rotary wing 70 as a buried-in-wing ducted rotary wing. The rotary wing 70 according to the example embodiment may serve as a propulsion device for lifting (a buried-in-wing ducted rotary wing) that generates lift to be used upon vertical take-off and vertical landing of the vertical take-off and landing aircraft 10.

The forward-move propulsion device 90 may generate propulsive force to allow the vertical take-off and landing aircraft 10 to move forward. The forward-move propulsion device 90 may include, for example, a jet engine. The forward-move propulsion device 90 may be provided at a rear end of the body 30. For example, one forward-move propulsion device 90 may be provided in the middle, another forward-move propulsion device 90 may be provided on the left side, and another forward-move propulsion device 90 may be provided on the right side in a left-right direction of the body 30. Thus, the vertical take-off and landing aircraft 10 according to the example embodiment may have a configuration in which the body 30 of the fixed-wing aircraft provided with the forward-move propulsion devices 90 is combined with the buried-in-wing ducted rotary wings 70 serving as a propulsion device for lifting.

[2. Internal Configuration of Wing Apparatus]

Figure 2:
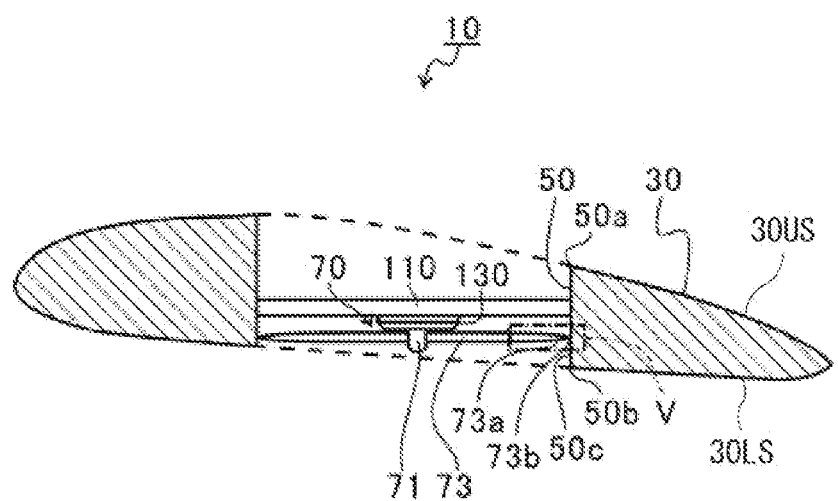
FIG. 2 is a schematic cross-sectional view of an example of a body taken along a line II-II in FIG. 1.

FIG. 2 is a schematic diagram illustrating a cross-section of the body 30 taken in a vertical direction along a line II-II (a position of the wing body) in FIG. 1. As illustrated in FIG. 2, the body 30 may have a vertical cross-section of an airfoil shape that generates upward lift for the vertical take-off and landing aircraft 10. The body 30 may be provided with the ducts 50 that each run through from an upper-surface opening 50a to a lower-surface opening 50b. Disposed in each of the ducts 50 may be a support 110, an electric motor 130, and the rotary wing 70.

The support 110 may have a rod shape, for example. The support 110 may have both ends coupled to an inner wall surface 50c of the duct 50. The support 110 may support the electric motor 130 and the rotary wing 70. The electric motor 130 may cause the rotary wing 70 to rotate with use of electric power supplied from an unillustrated battery. The rotary wing 70 may include a hub 71 and two or more blades 73. The hub 71 may be attached to a rotational shaft of the electric motor 130, and rotate together with the rotational shaft of the electric motor 130. The blades 73 may be coupled to the hub 71, and be rotatable about the hub 71. The blades 73 may be attached to the hub 71 at the center in such a manner as to extend radially from the hub 71. Each of the blades 73 may have one end coupled to the hub 71, and the other end which is a free end, i.e., a tip 73a. The blades 73 may each have a tip surface 73b which is an end surface on the outer side in a radial direction of the blade 73. The radial direction of the blade 73 is same as a radial direction on a rotation axis of the hub 71. The rotation axis of the hub 71 is same as a rotation axis of the rotary wing 70. The rotation axis of the rotary wing 70 may extend along with a central axis direction of the duct 50. The tip surface 73b is provided at the tip 73a which is the free end of the blade 73. The tip surface 73b may face a part of the inner wall surface 50c of the duct 50.

[3. Issue of Existing Ducted Rotary Wing]

Figure 4:
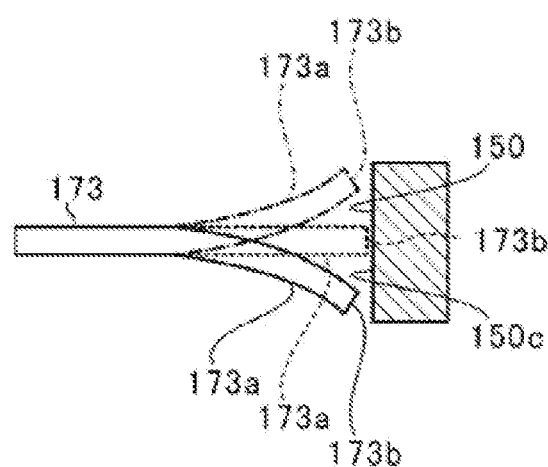
FIG. 4 is a schematic cross-sectional view of a tip of the blade and an inner wall surface of a duct according to the comparative example.

Referring now to FIGS. 3A, 3B, and 4, a description will be given of a configuration and an issue of a blade 173 of a ducted rotary wing according to a comparative example. FIGS. 3A and 3B are each a schematic configuration diagram illustrating a tip surface 173b of the blade 173 of the ducted rotary wing according to the comparative example. FIG. 3A is an upper-surface perspective view of the tip surface 173b of the blade 173 at the time of rotation as viewed obliquely from the upper surface side. FIG. 3B is a blade side view of the blade 173 at the time of rotation as viewed from the tip surface 173b side. In FIGS. 3A and 3B, a flow of air is represented by a white arrow.

As illustrated in FIG. 3B, upon rotation of the blade 173, air flows on the upper surface side and the lower surface side of the blade 173 having an airfoil shape from the front side toward the rear side in a rotation direction of the blade 173. In this case, the pressure of the air flowing on the lower surface side of the blade 173 having the airfoil shape that generates lift is higher than the pressure of the air flowing on the upper surface side of the blade 173. For example, the pressure of the air flowing on the lower surface side of the blade 173 is positive pressure P1 that is higher than the atmospheric pressure. The pressure of the air flowing on the upper surface side of the blade 173 is negative pressure P2 that is lower than the atmospheric pressure. Note that the negative pressure P2 is lower than the atmospheric pressure but has a positive value (positive pressure P1>atmospheric pressure>negative pressure P2>0). Thus, upon the rotation of the blade 173, the pressure on the upper surface side of the blade 173 and the pressure on the lower surface side of the blade 173 have a pressure difference $\Delta P$ therebetween ($\Delta P$=P1−P2). The blade 173 has the airfoil shape that generates lift with use of such a pressure difference $\Delta P$ between the upper surface side and the lower surface side.

In this case, a so-called tip leakage flow 200 is generated on the tip surface 173b of the blade 173. The tip leakage flow 200 is a flow of air that curls up from the positive pressure side (the lower side) to the negative pressure side (the upper side) of the blade 173. As illustrated in FIG. 3A, the tip leakage flow 200 generates a vortex on the negative pressure side of the blade 173, leading to generation of a tip vortex 210 which may cause induced drag or noise.

FIG. 4 is a schematic cross-sectional view of the tip 173a of the blade 173 and an inner wall surface 150c of a duct 150 according to the comparative example. FIG. 4 illustrates cross-sectional shapes of the tip 173a of the blade 173 and the inner wall surface 150c of the duct 150 in a cross-section including a center axis of the duct 150 according to the comparative example.

In FIG. 4, a clearance between the tip surface 173b of the blade 173 represented by a broken line and the inner wall surface 150c of the duct 150 is set to be as small as possible within a range that allows the tip surface 173b and the inner wall surface 150c not to touch each other during the rotation of the blade 173. If the clearance between the tip surface 173b and the inner wall surface 150c can be made as small as possible as described above, it is possible to reduce the tip leakage flow 200 illustrated in FIGS. 3A and 3B, making it possible to reduce generation of the tip vortex 210.

However, in the ducted rotary wing having the blades 173 (rotors) with a large diameter, the blade 173 is deformed to be bent downward due to its own weight when the rotation is stopped. In contrast, the blade 173 is deformed to extend in a radial direction due to centrifugal force while being bent upward due to lift upon the rotation. If the blade 173 is deformed in accordance with the rotation state and the tip surface 173b is greatly displaced as described above, it is difficult to cause the clearance between the tip surface 173b and the inner wall surface 150c to be as small as possible, making it difficult to reduce generation of the tip vortex 210, which may be an issue. Such an issue of the existing technique such as that according to the comparative example will be described in detail with reference to FIG. 4 below.

As represented by a solid line in FIG. 4, upon low-speed rotation of the blade 173, the tip 173a of the blade 173 is deformed to be bent downward due to its own weight, and the tip surface 173b is displaced downward. Further, as represented by a broken line in FIG. 4, upon middle-speed rotation of the blade 173, because the own weight of the blade 173 and the lift are balanced, the blade 173 is deformed to extend in the radial direction due to centrifugal force, and the tip surface 173b is displaced in a direction approaching the inner wall surface 150c of the duct 150. Further, as represented by a dash-dot-dash line in FIG. 4, upon high-speed rotation of the blade 173, the blade 173 is deformed to extend in the radial direction due to centrifugal force while being bent upward by lift, and the tip surface 173b is displaced upward.

Therefore, for example, in a case where the clearance between the tip surface 173b of the blade 173 and the inner wall surface 150c of the duct 150 is set to the minimum value for the middle-speed rotation which is the case represented by the broken line in FIG. 4, the clearance between the tip surface 173b of the blade 173 and the inner wall surface 150c of the duct 150 becomes larger than the set minimum value upon the low-speed rotation which is the case represented by the solid line in FIG. 4 and upon the high-speed rotation which is the case represented by the dash-dot-dash line in FIG. 4. As a result, it is difficult to reduce the tip leakage flow 200 of the blade 173 upon the low-speed rotation and the high-speed rotation, making it difficult to reduce generation of the tip vortex 210. This has been an issue of the existing technique.

[4. Configuration of Tip Surface According to Example Embodiment]

Figure 5:
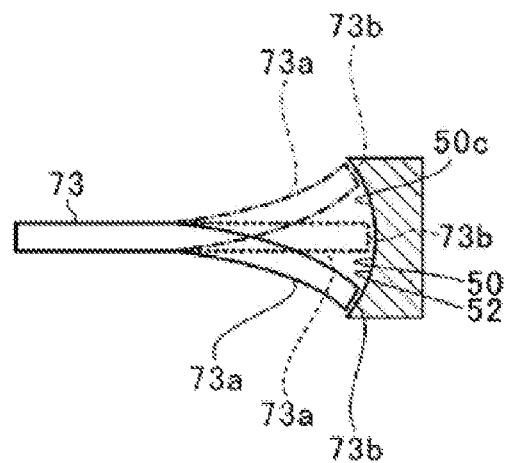
FIG. 5 is a schematic cross-sectional view of an example of a tip of a blade and an inner wall surface of a duct according to the example embodiment.

To address the issue of the existing technique described above, a ducted rotary wing according to an example embodiment of the technology may be improved in the shape of the inner wall surface 50c of the duct 50. FIG. 5 is a partial cross-sectional view, in an enlarged manner, of a portion V of the blade 73 and the inner wall surface 50c of the duct 50 represented by a dash-dot-dash line in FIG. 2. FIG. 5 illustrates a cross-sectional shape of the tip 73a of the blade 73 and the inner wall surface 50c of the duct 50 in a cross-section including a central axis of the duct 50 according to the example embodiment.

As illustrated in FIG. 5, the inner wall surface 50c of the duct 50 may have a curved surface 52 having a shape corresponding to displacement of the tip surface 73b of the blade 73 in accordance with the rotation state of the rotary wing 70. In more detail, the curved surface 52 of the inner wall surface 50c of the duct 50 may have a curved-surface shape corresponding to the displacement of the tip surface 73b at the time when the free end (the tip 73a) of the blade 73 is deformed in a central axis direction and the radial direction of the duct 50 in accordance with the rotation state of the rotary wing 70. The curved surface 52 may be positioned with a constant distant from the tip surface 73b represented by each of the solid line, the broken line, and the dash-dot-dash line in FIG. 5. The curved surface 52 may have an inner diameter that varies in the central axis direction of the duct 50. The inner diameter of the curved surface 52 may gradually decrease from the middle position toward the upper side in the central axis direction of the duct 50. The inner diameter of the curved surface 52 may also gradually decrease from the middle position toward the lower side in the central axis direction of the duct 50. Lift and centrifugal force generated at the blade 73 may differ depending on factors including, without limitation, the mass, the material, the shape, and the rotational speed of the blade 73. That is, the amount of displacement of the tip surface 73b of the blade 73 may differ depending on the factors including, without limitation, the mass, the material, the shape, and the rotational speed of the blade 73. Therefore, the shape of the curved surface 52 may be set in accordance with the amount of the displacement of the tip surface 73*b* at the time of rotation of the blade 73 calculated by simulation. According to the example embodiment, the curved surface 52 may have various curvatures calculated by simulation. The curved surface 52 according to the example embodiment may thus include curved surfaces having respective radii of curvature different from each other.

As represented by the solid line in FIG. 5, upon the low-speed rotation, the tip 73*a* of the blade 73 may be deformed to be bent downward due to its own weight, and the tip surface 73*b* may be displaced downward. As represented by the broken line in FIG. 5, upon the medium-speed rotation, because the own weight of the blade 73 and lift are balanced, the blade 73 may be deformed to extend in the radial direction due to centrifugal force, and the tip surface 73*b* may be displaced in the direction approaching the inner wall surface 50*c* of the duct 50. As represented by the dash-dot-dash line in FIG. 5, upon the high-speed rotation, the blade 73 may be deformed to extend in the radial direction due to centrifugal force while being bent upward due to lift, and the tip surface 73*b* may be therefore displaced upward.

However, the inner wall surface 50*c* of the example embodiment may have the curved surface 52. This may allow the clearance between the tip surface 73*b* and the inner wall surface 50*c* to be substantially equal and to substantially have the minimum value upon all of the low-speed rotation, the medium-speed rotation, and the high-speed rotation of the blade 73. That is, this may allow the clearance between the tip surface 73*b* and the inner wall surface 50*c* to be as small as possible within a range that allows the tip surface 73*b* and the inner wall surface 50*c* not to touch each other upon all of the low-speed rotation, the medium-speed rotation, and the high-speed rotation of the blade 73. Therefore, it is possible to reduce the tip leakage flow 200 of the blade 73 upon all of the low-speed rotation, the medium-speed rotation, and the high-speed rotation of the blade 73, making it possible to reduce generation of the tip vortex 210.

[5. Configuration of Vent at Tip According to Example Embodiment]

Figure 6A:
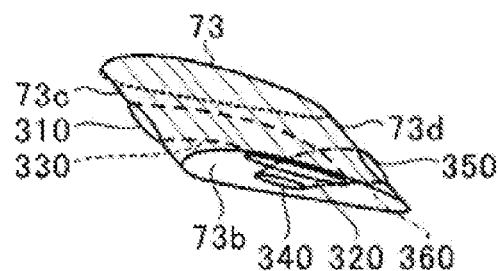
FIGS. 6A to 6C are each a schematic configuration diagram illustrating an example of the tip of the blade according to the example embodiment.
Figure 6B:
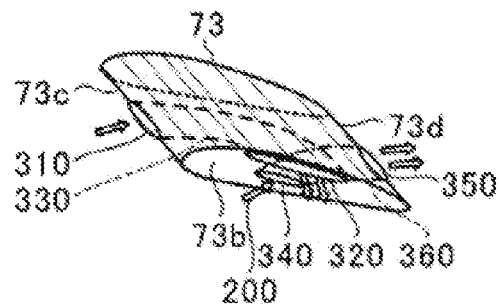
Figure 6C:
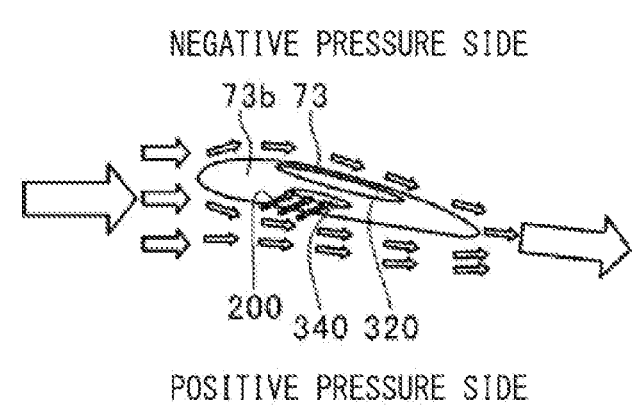

Next, referring to FIGS. 6A to 6C, a description will be given of a plurality of vents and a plurality of flow paths provided in the tip 73*a* of the blade 73 according to the example embodiment. FIGS. 6A to 6C are each a schematic configuration diagram illustrating the tip 73*a* of the blade 73 according to the example embodiment. FIGS. 6A and 6B are each an upper-surface perspective view of the tip 73*a* of the blade 73 at the time of rotation viewed obliquely from the upper surface side, and FIG. 6C is a blade side-surface view of the tip 73*a* of the blade 73 at the time of rotation viewed from the tip surface 73*b* side. In FIGS. 6A to 6C, a flow of air is represented by a white arrow.

As illustrated in FIG. 6C, upon rotation of the blade 73, the air may flow on the upper surface side and the lower surface side of the blade 73 having an airfoil shape from the front side toward the rear side in the rotation direction of the blade 73. In this case, the pressure of the air flowing on the lower surface side of the blade 73 having the airfoil shape that generates lift may be higher than the pressure of the air flowing on the upper surface side of the blade 73. For example, the pressure of the air flowing on the lower surface side of the blade 73 may be positive pressure P1 that is higher than the atmospheric pressure. The pressure of the air flowing on the upper surface side of the blade 73 may be negative pressure P2 that is lower than the atmospheric pressure. Note that the negative pressure P2 may be lower than the atmospheric pressure but have a positive value (positive pressure P1>atmospheric pressure>negative pressure P2>0). Thus, upon the rotation of the rotary wing 70, the pressure on the upper surface side of the blade 73 and the pressure on the lower surface side of the blade 73 may have a pressure difference ΔP therebetween (ΔP=P1−P2). The blade 73 may have the airfoil shape that generates lift with use of such a pressure difference ΔP between the upper surface side and the lower surface side.

As described above, upon the rotation of the rotary wing 70, positive pressure may be generated on one side (the lower side) of the blade 73, and negative pressure may be generated on the other side (the upper side) of the blade 73. Thus, upon hovering of the vertical take-off and landing aircraft 10, it is possible to support the own weight of the vertical take-off and landing aircraft 10 with use of the lift generated by the rotation of the rotary wing 70.

As illustrated in FIG. 6A, the blade 73 may have a leading-edge inlet 310, a tip outlet 320, a leading-edge flow path 330, a tip inlet 340, a trailing-edge outlet 350, and a trailing-edge flow path 360.

First, an airflow passing through the leading-edge inlet 310, the tip outlet 320, and the leading-edge flow path 330 will be described.

The leading-edge inlet 310 may be provided at a leading edge 73*c* that is an edge of the blade 73 on the front side in the rotation direction of the blade 73. The leading-edge inlet 310 may be positioned not on the hub 71 side (the inner-diameter side) but on the outer-diameter side (the tip surface 73*b* side) in the radial direction of the blade 73. As a result, the air may flow into the leading-edge inlet 310 at a higher flow rate as compared with a case where the leading-edge inlet 310 is positioned on the inner-diameter side. Further, the distance between the leading-edge inlet 310 and the tip outlet 320 may be shorter as compared with the case where the leading-edge inlet 310 is positioned on the inner-diameter side, making it easier to provide the leading-edge inlet 310, the tip outlet 320, and the leading-edge flow path 330.

The tip outlet 320 may be provided on the tip surface 73*b* of the blade 73. The tip outlet 320 may be provided on the upper surface side of the tip surface 73*b*, i.e., the negative pressure side of the tip surface 73*b*. The tip outlet 320 may be an opening having a substantially oval shape and extending in a width direction of the blade 73. The tip outlet 320 may have an opening width, in the width direction of the blade 73, that is greater than the opening width of the tip inlet 340 in the width direction of the blade 73 which will be described later. The tip outlet 320 may be positioned on the upper side of the tip inlet 340 on the tip surface 73*b*, i.e., on the negative pressure side on the tip surface 73*b*.

Referring to FIG. 6A, the leading-edge flow path 330 is represented by a broken line and may allow the leading-edge inlet 310 and the tip outlet 320 to be in communication with each other. The leading-edge flow path 330 may run through the inside of the blade 73, and allow the air to flow therein.

As represented by white arrows in FIG. 6B, upon the rotation of the blade 73, a portion of the air in the vicinity of the leading edge 73*c* of the blade 73 may be taken in from the leading-edge inlet 310 to flow into the leading-edge flow path 330, and flow through inside the leading-edge flow path 330 toward the tip surface 73*b*. Further, this portion of the air may flow out from the tip outlet 320 on the tip surface 73*b* toward the inner wall surface 50*c* of the duct 50 in the radial direction of the blade 73.

On this occasion, because the tip outlet 320 may be provided on the upper surface side (the negative pressure side) of the tip surface 73b, the air that has flown through the leading-edge flow path 330 may flow out from the negative pressure side of the tip surface 73b. This may form a high-pressure region of the flowing-out air between the negative pressure side of the tip surface 73b and the inner wall surface 50c of the duct 50. Such a high-pressure region may block the tip leakage flow 200. As a result, it is possible to reduce generation of the tip vortex 210.

For example, the air taken in from the leading-edge inlet 310 of the blade 73 may flow through the leading-edge flow path 330 in the blade 73 and blow out from the tip outlet 320 of the tip surface 73b of the blade 73. The air thus blowing out from the tip outlet 320 may form a high-pressure region between the tip surface 73b and the inner wall surface 50c of the duct 50. Such a high-pressure region may block the tip leakage flow 200. As a result, it is possible to reduce generation of the tip vortex 210.

Next, an airflow passing through the tip inlet 340, the trailing-edge outlet 350, and the trailing-edge flow path 360 will be described.

The tip inlet 340 may be provided on the tip surface 73b of the blade 73. The tip inlet 340 may be provided on the lower surface side of the tip surface 73b, i.e., the positive pressure side of the tip surface 73b. That is, the tip inlet 340 may be positioned on the lower side of the tip outlet 320, i.e., on the positive pressure side. Further, as illustrated in FIG. 6C, the tip inlet 340 and the tip outlet 320 may be provided side by side in a flowing direction of the tip leakage flow 200. This may cause the tip leakage flow 200 to first reach the tip inlet 340 and thereafter reach the tip outlet 320.

The trailing-edge outlet 350 may be provided at a trailing edge 73d that is an edge of the blade 73 on the rear side in the rotation direction of the blade 73. The trailing-edge outlet 350 may be positioned not on the hub 71 side (the inner-diameter side) but on the outer-diameter side (the tip surface 73b side) in the radial direction of the blade 73. As a result, the distance between the trailing-edge outlet 350 and the tip inlet 340 may be shorter as compared with the case where the trailing-edge outlet 350 is positioned on the inner-diameter side, making it easier to provide the tip inlet 340, the trailing-edge outlet 350, and the trailing-edge flow path 360.

Referring to FIG. 6A, the trailing-edge flow path 360 is represented by a dash-dot-dash line and may allow the tip inlet 340 and the trailing-edge outlet 350 to be in communication with each other. The trailing-edge flow path 360 may not be in communication with the leading-edge flow path 330, and run through the inside of the blade 73.

As represented by the white arrows in FIG. 6B, upon the rotation of the blade 73, the tip leakage flow 200 may reach the tip inlet 340 in the middle of flowing from the lower surface side toward the upper surface side of the blade 73. Accordingly, a portion of the air of the tip leakage flow 200 may be taken in from the tip inlet 340 to flow into the trailing-edge flow path 360, and flow through inside the trailing-edge flow path 360 toward the trailing edge 73d of the blade 73. Further, this portion of the air flowing inside the trailing-edge flow path 360 may flow out from the trailing-edge outlet 350 at the trailing edge 73d toward the rear side of the blade 73.

As described above, a portion of the tip leakage flow 200 may flow into the tip inlet 340 and flow out from the trailing-edge outlet 350 to the rear side of the blade 73. This suppresses formation of the tip vortex 210. Accordingly, it is possible to reduce the amount of the tip leakage flow 200 curling up from the lower surface side to the upper surface side of the blade 73 as illustrated in FIG. 3A. As a result, it is possible to reduce generation of the tip vortex 210 deriving from the tip leakage flow 200.

For example, providing the tip inlet 340 on the positive pressure side (the lower side) of the tip surface 73b of the blade 73 may cause the air on the positive pressure side between the tip surface 73b and the inner wall surface 50c of the duct 50 to be taken in from the tip inlet 340 to the inside of the blade 73. Further, the air taken in from the tip inlet 340 may flow through the trailing-edge flow path 360 inside the blade 73, and be discharged from the trailing-edge outlet 350 at the trailing edge 73d of the blade 73. Thus, the air on the positive pressure side between the tip surface 73b and the inner wall surface 50c of the duct 50 may be taken in from the tip inlet 340 and be discharged from the trailing-edge outlet 350. This makes it possible to reduce the tip leakage flow 200 flowing from the lower side toward the upper side (from the positive pressure side toward the negative pressure side) of the tip surface 73b, making it possible to reduce generation of the tip vortex 210.

Furthermore, the tip outlet 320 may be provided on the upper side (the negative pressure side) of the blade 73 as compared with the tip inlet 340 on the tip surface 73b. Therefore, the air may be blown out from the tip outlet 320 to form a high-pressure region on the upper side (the negative pressure side) between the tip surface 73b and the inner wall surface 50c of the duct 50. Such a high-pressure region may block the airflow, promoting the air on the positive pressure side to be taken in from the tip inlet 340 positioned on the lower side (the positive pressure side) of the tip outlet 320. This makes it possible to further enhance an effect of discharging the air through the tip inlet 340, the trailing-edge flow path 360, and the trailing-edge outlet 350, making it possible to further reduce the tip leakage flow 200.

In other words, the tip inlet 340 may be positioned on the lower side (the positive pressure side) of the tip outlet 320 on the tip surface 73b. Therefore, a portion of the tip leakage flow 200 blocked by the high-pressure region formed by the air flowing out from the tip outlet 320 flows into the tip inlet 340. Accordingly, as compared with a case where the tip inlet 340 is provided on the upper side of the tip outlet 320, the amount of the tip leakage flow 200 reaching the upper surface side from the lower surface side of the blade 73 is allowed to be reduced. As a result, it is possible to reduce generation of the tip vortex 210 deriving from the tip leakage flow 200.

Moreover, according to the example embodiment, the blade 73 may be provided with: the leading-edge flow path 330 allowing the leading-edge inlet 310 and the tip outlet 320 to be in communication with each other; and the trailing-edge flow path 360 allowing the tip inlet 340 and the trailing-edge outlet 350 to be in communication with each other, to thereby reduce generation of the tip vortex 210. This makes it possible to omit a power source dedicated to reducing the generation of the tip vortex 210, contributing to reduce the number of components and costs.

Although some example embodiments of the technology have been described with reference to the accompanying drawings, the technology is by no means limited to the example embodiments described above. It should be appreciated that various modifications and alterations may be made by persons skilled in the art without departing from the scope as defined by the appended claims. The technology is intended to include such modifications and alterations in the technical scope thereof.

The example embodiment has been described above referring to the example where the leading-edge inlet 310, the tip outlet 320, and the leading-edge flow path 330 are provided in the blade 73; however, this is non-limiting. The leading-edge inlet 310, the tip outlet 320, and the leading-edge flow path 330 are not necessarily provided. Therefore, in one example, the blade 73 may be provided only with the tip inlet 340, the trailing-edge outlet 350, and the trailing-edge flow path 360.

The example embodiment has been described above referring to the example where the tip inlet 340, the trailing-edge outlet 350, and the trailing-edge flow path 360 are provided in the blade 73; however, this is non-limiting. The tip inlet 340, the trailing-edge outlet 350, and the trailing-edge flow path 360 are not necessarily provided. Therefore, in one example, the blade 73 may be provided only with the leading-edge inlet 310, the tip outlet 320, and the leading-edge flow path 330.

The example embodiment has been described above referring to the example where the inner wall surface 50*c* of the duct 50 has the curved surface 52; however, this is non-limiting. The curved surface 52 is not necessarily provided. In one example, the inner wall surface 50*c* of the duct 50 may have no curved surface 52.

The example embodiment has been described above referring to an example where the vertical take-off and landing aircraft 10 includes the forward-move propulsion device 90; however, this is non-limiting. The forward-move propulsion device is not necessarily provided. For example, the forward-move propulsion device may be omitted and the direction of the rotary wing 70 (the rotary wing for lifting) provided for vertical take-off and vertical landing may be variable. With such a configuration, the rotary wings 70 (the rotary wings for lifting) provided for vertical take-off and vertical landing may be also used as the propulsion device for forward moving (a rotary wing for forward moving).

The example embodiment has been described above referring to the example where the inner wall surface 50*c* of the duct 50 has the curved surface 52 as shown in FIG. 5; however, this is non-limiting. The curved surface 52 is not necessarily provided. In one example, the inner wall surface 50*c* of the duct 50 may have no curved surface 52.

The example embodiment has been described above referring to an example where the electric motor 130 is provided in the duct 50 as a power source configured to cause the rotary wing 70 to rotate; however, this is non-limiting. For example, a lift jet may be provided as a power source instead of the electric motor 130.

The invention claimed is:

1. A vertical take-off and landing aircraft comprising:
a body including an upper surface and a lower surface; and
a ducted rotary wing provided in the body,
wherein the ducted rotary wing includes:
a duct running through the body from the upper surface to the lower surface, and
a rotary wing provided inside the duct and including a hub and a blade, the blade being operable to rotate about the hub,
wherein the blade has a fixed end coupled to the hub and a tip opposite the fixed end,
wherein the blade is flexible such that (1) when the blade is at a standstill, the blade bends toward the lower surface due to a weight of the blade and (2) as the blade begins rotating and a rotational speed increases, the tip of the blade moves closer to the upper surface,
wherein the duct has an inner wall surface that has a curved concave surface that maintains a consistent distance with the tip of the blade that moves between the lower surface and the upper surface of the body, and
wherein the blade includes:
a tip inlet provided on a tip surface of the tip;
a trailing-edge outlet provided at a trailing edge of the blade, the trailing edge being an edge on a rear side in a rotation direction of the blade; and
a trailing-edge flow path allowing the tip inlet and the trailing-edge outlet to be in communication with each other.

2. A wing apparatus comprising the ducted rotary wing included in claim 1.

3. A vertical take-off and landing aircraft comprising:
a body including an upper surface and a lower surface; and
a ducted rotary wing provided in the body,
wherein the ducted rotary wing includes:
a duct running through the body from the upper surface to the lower surface; and
a rotary wing provided inside the duct and including a hub and a blade, the blade being operable to rotate about the hub,
wherein the blade has a fixed end coupled to the hub and a tip opposite the fixed end,
wherein the blade is flexible such that (1) when the blade is at a standstill, the blade bends toward the lower surface due to a weight of the blade and (2) as the blade begins rotating and a rotational speed increases, the tip of the blade moves closer to the upper surface,
wherein the duct has an inner wall surface that has a curved concave surface that maintains a consistent distance with the tip of the blade that moves between the lower surface and the upper surface of the body, and
wherein the blade includes:
a leading-edge inlet provided at a leading edge of the blade, the leading edge being an edge on a front side in a rotation direction of the blade;
a tip outlet provided on a tip surface of the blade; and
a leading-edge flow path allowing the leading-edge inlet and the tip outlet to be in communication with each other.

4. A wing apparatus comprising the ducted rotary wing included in claim 3.

5. A vertical take-off and landing aircraft comprising:
a body including an upper surface and a lower surface; and
a ducted rotary wing provided in the body,
wherein the ducted rotary wing includes:
a duct running through the body from the upper surface to the lower surface; and
a rotary wing provided inside the duct and including a hub and a blade, the blade being operable to rotate about the hub,
wherein the blade includes:
a leading-edge inlet provided at a leading edge of the blade, the leading edge being an edge on a front side in a rotation direction of the blade;
a tip outlet provided on a tip surface of the blade; and
a leading-edge flow path allowing the leading-edge inlet and the tip outlet to be in communication with each other, and
wherein the blade further includes:
a tip inlet provided on a lower side of the tip outlet on the tip surface of the blade;
a trailing-edge outlet provided at a trailing edge of the blade, the trailing edge being an edge on a rear side in the rotation direction of the blade; and a trailing-edge flow path allowing the tip inlet and the trailing-edge outlet to be in communication with each other.

6. A wing apparatus comprising the ducted rotary wing included in claim 5.

7. The vertical take-off and landing aircraft according to claim 5,
wherein the blade has a fixed end coupled to the hub and a tip opposite the fixed end,
wherein the blade is flexible such that (1) when the blade is at a standstill, the blade bends toward the lower surface due to a weight of the blade and (2) as the blade begins rotating and a rotational speed increases, the tip of the blade moves closer to the upper surface, and
wherein the duct has an inner wall surface that has a curved concave surface that maintains a consistent distance with the tip of the blade that moves between the lower surface and the upper surface of the body.

* * * * *